Patented June 11, 1929.

1,716,590

UNITED STATES PATENT OFFICE.

ARTHUR R. LYTLE, OF ELMHURST, NEW YORK, ASSIGNOR TO UNION CARBIDE & CARBON RESEARCH LABORATORIES, INC., A CORPORATION OF NEW YORK.

NONFERROUS WELDING ROD.

No Drawing.   Application filed December 6, 1927.   Serial No. 238,230.   REISSUED My invention relates to brass welding rods that may be utilized extensively for fusion welding or brazing brass and bronze alloys and for bronze welding copper and ferrous alloys.

Brass welding rods consisting principally of an alloy of copper and zinc, but known commercially as bronze welding rods, are used extensively for uniting steel, cast iron, malleable iron, copper and brass sections. The principal merits of these rods are low melting point, the ease with which a good union with the base metal is obtained, and the ductility of the weld produced. However, their use has been limited because of the lack in the deposited metal of wearing qualities and strength as compared to steel, and because in welding, they emit clouds of fumes that are troublesome to the operator.

Attempts have been made to increase the strength of these alloys by adding tin, manganese and iron, but excessive amounts of tin makes the alloy brittle, and manganese and iron, more particularly the former, adversely effect the welding properties and make the weld metal porous. Iron up to 1.1% has been added to provide a welded bearing metal but the deposited metal is quite porous and is unsuitable for joining members where strength and ductility are required.

My welding rods contain copper and zinc in the approximate proportion of 60 parts of copper to 40 parts of zinc. The rods contain from .01% to 4% silicon. For obtaining weld metal of greater strength, I modify the rods by the addition of iron or manganese, or both iron and manganese. The content of iron and manganese may vary from 0 to 4%. When manganese is present the silicon content is preferably, though not necessarily, at least 10% of the manganese content. In general, an increase in strength accompanies an increase in the content of iron and manganese, provided silicon is present. The presence of a small amount of tin increases the fluidity of the melted metal and is a desirable constituent. One-tenth per cent of tin is beneficial but I may in some cases include as much as 1.5%.

I have made rods containing—

Copper _____ 55– 65%
Silicon _____ .01– 4%
Manganese _____ 0– 4%
Iron _____ 0– 4%
Tin _____ 0–1.5%
Zinc _____ Balance, the proportion of copper to zinc being within the range 2:1 to 4:3.

Alloys within the above range do not emit troublesome zinc fumes when used for welding. The metal does not boil and the zinc content remains practically constant during welding. The rods containing copper, zinc and silicon give satisfactory results with brass and copper base metals but with ferrous base metals a brittle bond between the base metal and the weld metal sometimes develops. The presence of about .75% of iron avoids the brittleness and causes a strong bond to form between the base metal and weld metal, the strength and wearing qualities of the latter being considerably greater than when the old type of bronze welding rods is used.

The following alloys are illustrative of my invention:

|           | A     | B     | C     | D     | E     | F     |
|-----------|-------|-------|-------|-------|-------|-------|
| Copper    | 57.00 | 59.00 | 59.40 | 58.80 | 60.00 | 61.00 |
| Zinc      | 41.96 | 38.74 | 38.67 | 37.86 | 37.15 | 37.95 |
| Iron      | 1.00  | 1.00  | 1.00  | 1.40  | 1.00  | .70   |
| Manganese | .03   | 1.25  | .85   | 1.80  | 1.00  | .28   |
| Silicon   | .01   | .01   | .08   | .14   | .20   | .07   |
| Tin       |       |       |       |       | .65   |       |

For most welding purposes I prefer rods containing copper .58% to 60%, iron .75% to 1.25%, manganese .85% to 1.1%, tin nil to 0.20%, silicon .10% to .25% and the remainder zinc and minor impurities.

I claim:

1. A welding rod consisting predominantly of copper and zinc and containing silicon .1% to .25%, iron .75% to 1.5% and manganese .85 to 2%, the copper being about 58% to 60%.

2. A welding rod consisting predominantly of copper and zinc and containing silicon .1% to .25%, iron .75% to 1.25% and manganese .85% to 1.1%, the copper being about 58% to 60%.

3. A welding rod containing copper, zinc and silicon; the sum of the copper and zinc contents being at least 82.5%; the copper content falling within the range 55% to 65% and the silicon content falling between 0.01% and 4%.

4. A welding rod containing copper, zinc, silicon and tin; the sum of the copper and zinc contents being at least 82.5%; the copper content falling within the range 55% to 65%; the silicon content falling between 0.01% and 4%; and the tin content falling between 0.1% and 1.5%.

5. A welding rod containing copper, zinc, silicon, tin and a strengthening addition of a metal having the properties of iron and manganese; the sum of the coper and zinc contents being at least 82.5%; the copper content falling within the range 55% to 65%; the silicon content falling between 0.01% and 4%; the zinc content falling between 0.1% and 1.5%; and the content of strengthening metal being not greater than 4%.

In testimony whereof, I affix my signature.

ARTHUR R. LYTLE.